United States Patent [19]

Davis et al.

[11] Patent Number: 4,910,488
[45] Date of Patent: Mar. 20, 1990

[54] ROTARY VARIABLE DIFFERENTIAL TRANSFORMER WITH ECCENTRIC ROTOR CORE

[75] Inventors: Clark C. Davis, Holladay; Dwight M. Potter, Salt Lake City, both of Utah

[73] Assignee: Sarcos Group, Salt Lake City, Utah

[21] Appl. No.: 380,584

[22] Filed: Jul. 17, 1989

[51] Int. Cl.⁴ .............................................. A01F 21/06
[52] U.S. Cl. ....................................... 336/83; 336/135
[58] Field of Search ................... 336/83, 79, 120, 135, 336/130

[56] References Cited

U.S. PATENT DOCUMENTS

| | | | |
|---|---|---|---|
| 2,730,664 | 1/1956 | Karlson | 336/135 X |
| 3,101,462 | 8/1963 | Swainson | 336/133 X |
| 3,398,386 | 8/1968 | Summerlin | 336/135 |
| 3,430,173 | 11/1966 | Orlando | 336/120 X |
| 3,641,467 | 2/1972 | Ringland et al. | 336/135 X |
| 3,818,401 | 6/1974 | Mouri et al. | 336/120 X |
| 3,882,436 | 5/1975 | Chass | 336/135 X |
| 4,117,436 | 9/1978 | MacLennan | 336/120 X |
| 4,347,491 | 8/1982 | Chass | 336/135 |
| 4,434,412 | 2/1984 | Ruumpol | 336/135 X |
| 4,551,699 | 11/1985 | de Jang et al. | 336/135 |

OTHER PUBLICATIONS

Herseg, Edward E., "Handbook of Measurement, and Control".
Schaefitz Engineering, Pennsauken, N.J., pp. 9–12 to 9–15.

Primary Examiner—Thomas J. Kozma
Attorney, Agent, or Firm—Thorpe, North & Western

[57] ABSTRACT

A rotary variable differential transformer produces a substantially linear output over about 180 degrees of rotation of a rotor core. The transformer includes a base housing having a central bore, and a rotor having a shaft whose angular displacement is to be determined and a generally planar, circular rotor core mounted off-center at one end of the shaft and in a plane normal thereto. The rotor core is rotatably disposed within the opening of the base housing. Also included is a primary coil disposed in the opening of the base housing to circumscribe the shaft at a location rearwardly of the rotor core. First and second windings, with cores, are carried by the base housing and positioned about the base housing opening so that the axes of the coils are oriented radially of the opening and generally in a common plane with the rotor core. The first and second windings are connected together in series opposition. A casing surrounds the sides of the base housing and at least a portion of the rear of the base housing, and includes an opening through which the shaft projects.

7 Claims, 2 Drawing Sheets

ROTARY VARIABLE DIFFERENTIAL TRANSFORMER WITH ECCENTRIC ROTOR CORE

BACKGROUND OF THE INVENTION

This invention relates to a new and improved, compact rotary variable differential transformer having an eccentric rotor core.

Rotary variable differential transformers (RVDT) are well known transducer devices used for measuring angular displacement. Mechanical angular displacement or rotation is converted into an analog electrical signal suitable for processing, control, display, etc. RVDT's typically include a primary winding, a pair of secondary windings, a rotor and a stator. An input voltage is supplied to the primary winding which induces an output voltage across the secondary windings, the magnitude of which is dependent upon the angular displacement and position of the rotor. This position determines the magnetic coupling between the primary and secondary windings which in turn determines the magnitude of the output voltage. The rotor, of course, is coupled to the element whose angular displacement is to be determined. Exemplary RVDT's are shown in U.S. Pat. Nos. 4,347,491, 4,551,699, 3,882,436 and 3,818,401, and in Herseg, Edward E., "*Handbook of Measurement and Control*", Schaefitz Engineering, Pennsanken, N.J.

A principal problem with these and other prior art RVDT's is that the linear operating ranges of the RVDT's are very narrow. The reason for this is that the voltage output curves are symmetrical which tends to narrow the linear region of the curves between the positive nd negative peaks. Another disadvantage of many prior art devices is the complicated, oftentimes bulky structure of the devices.

SUMMARY OF THE INVENTION

It is an object of the invention to provide a rotary variable differential transformer having a wide linear operating range.

It is another object of the invention to provide such a transformer which is simple in design and easy to construct.

It is a further object of the invention to provide a transformer which is highly sensitive to angular displacements.

The above and other objects of the invention are realized in a specific illustrative embodiment of a rotary variable differential transformer which includes an annular base element having a central, generally circular opening, and a rotor having a shaft and a generally circular rotor core mounted off-center at one end of the shaft and in a plane normal thereto. The rotor core is rotatably disposed in the opening of the base element so that the shaft projects from the rear thereof. A primary winding is disposed in the opening of the base element to circumscribe the shaft rearwardly of the rotor core. First and second secondary windings, with cores, are carried by the base element in positions spaced circumferentially about the base element opening, with the axes of the first and second windings oriented radially of the opening and generally in a common plane with the rotor core so that as the rotor core is rotated, its periphery moves into close proximity first with one of the secondary windings and then with the other. The first and second windings are connected in series opposition. A conductive casing surrounds the sides and at least a portion of the rear of the base element, with the casing having an opening in the rear through which the shaft projects.

An AC voltage signal is supplied to the primary winding and this induces a magnetic flux from the primary winding through the shaft and rotor core to the secondary windings and cores and then through the casing back to the shaft and primary winding. This induces voltage signals in the secondary windings and the amplitude and phase of these signals provides a measure of the angular displacement of the rotor core and thus of the shaft which is connected to the element whose angular position is to be determined.

BRIEF DESCRIPTION OF THE DRAWINGS

The above and other objects, features and advantages of the invention will become apparent from a consideration of the following detailed description presented in connection with the accompanying drawing in which.

DETAILED DESCRIPTION

Figure 1:
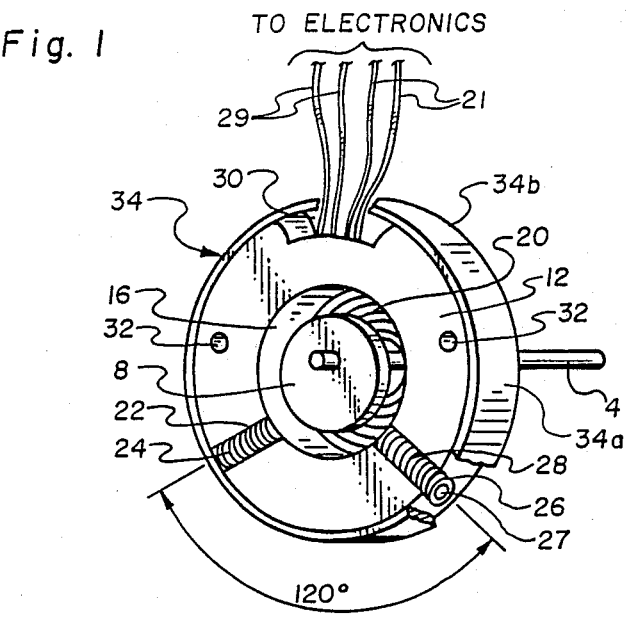
FIG. 1 is a perspective, partially cutaway view of a rotary variable differential transformer made in accordance with the principles of the present invention.

Referring to FIG. 1, there is shown a specific illustrative embodiment of a rotary variable differential transformer made in accordance with the present invention for measuring angular displacement or rotation of a metallic rotor shaft 4 which would be connected to an element whose positioning is to be determined. That is, the position of the shaft 4 provides an indication of the positioning of the ultimate element of interest.

Mounted off-center on the shaft 4 is a generally circular and planar metallic rotor core 8. The rotor core 8 is mounted so that the shaft 4 extends rearwardly thereof and normal to the plane defined by the rotor core. The shaft 4 is shown off-center of the rotor core 8 by a distance of about ten percent of the diameter of the rotor core. Other distances, however, as well as other shapes for the rotor core could be provided to achieve the results to be discussed later.

Positioned about the rotor core 8 is a base element or housing 12 made of a nonmagnetic material such as plastic, nylon, etc. The housing 12 is shaped in the form of an annulus having a generally cylindrical central bore or opening 16, within which the rotor core 8 and a portion of the shaft 4 are disposed. Also disposed in the central opening 16 is a primary winding or coil 20 which is located behind the rotor core 8 and circumscribes the rotor shaft 4. The primary winding 20 is coupled by leads 21 to an AC signal source (shown in FIG. 3 at 50).

Also formed in the housing 12 are two generally cylindrically shaped openings 22 and 26 which extend radially outwardly from the opening 16. As can be seen in FIG. 1, the axes of the openings 22 and 26 are spaced apart about 120 degrees. Disposed in the openings 22 and 26 are secondary windings 24 and 28 respectively, and respective cylindrical cores made of a magnetic material, such as core 27. The axes of the windings 24 and 28 generally coincide with the axes of the openings 22 add 26 respectively. The windings 24 and 28 are connected together in series opposition and by leads 29 to signal processing equipment and output circuitry (shown in FIG. 3 at 60). The connections of the secondary windings 24 and 28 and of the primary winding 20 are not shown in FIG. 1 but would extend through pathways formed in the housing 12.

A gap or channel 30 is formed at the top of the housing 12 simply to accommodate collection of the leads 21 and 29 for ultimate exit from the housing. Two openings 32 on opposite sides of the housing 12 are formed to receive mounting bolts or other mounting elements.

The base housing 12 is disposed in a metallic casing 34 having side walls 34a which circumscribe the housing 12 and a back wall 34b which extends behind the housing and primary coil 20. An opening (not shown) is formed in the back wall 34b, through which the shaft 4 extends.

The device operates by developing flux paths through both secondary windings 24 and 28 (which are connected in phase opposition) and cores, through the rotor core 8, the shaft 4 and primary winding 16, and the casing 34 back to the secondary windings and cores. The strength of the two flux paths vary depending upon the angular position of rotor core 8 so that when the rotor core is closer to one of the secondary windings and core, the magnetic flux through that winding and core is greater. By measuring tee flux difference between the two secondary windings, the angular position of the rotor core 8 and thus the shaft 4 can be determined.

Figure 2:
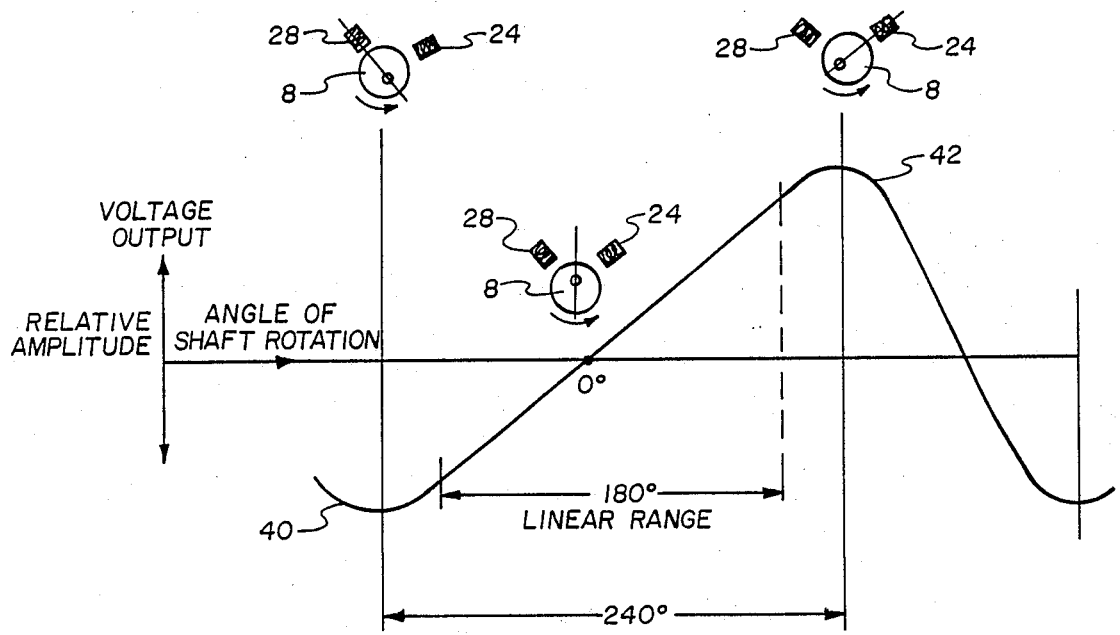
FIG. 2 is a graphic representation of shaft rotation of the RVDT and the resulting output voltage.

FIG. 2 shows the voltage output curve for the synchronous circuit 60 (FIG. 3), for different angular positions of the rotor core 8, when an AC voltage is applied to the primary winding 20. It will be noted that the output curve is asymmetrical, displaying a linear operating range of about 180 degrees contained within with the curve between its negative and positive peaks. The negative peak (or valley) 40 occurs when the rotor core 8 is rotated to a position closest to secondary winding 28 and thus there is a maximum flux output from winding 28, as depicted in FIG. 2. The positive peak 42 of the curve occurs when the rotor core 8 is rotated to a position closest to secondary winding 24 so that there is a maximum flux output from that winding. As the rotor core 8 is rotated (counterclockwise in FIG. 2) from the secondary winding 28 towards the secondary winding 24, the magnitude of the output voltage varies in a fairly linear fashion as shown in FIG. 2. The voltage output is zero when the rotor core 8 is in the null position—rotated one half the distance between secondary winding 28 and secondary winding 24.

It is noted that a very wide effective linear range of operation is provided with the configuration of the present invention. This is done with a simple, easy to construct and compact device.

Figure 3:
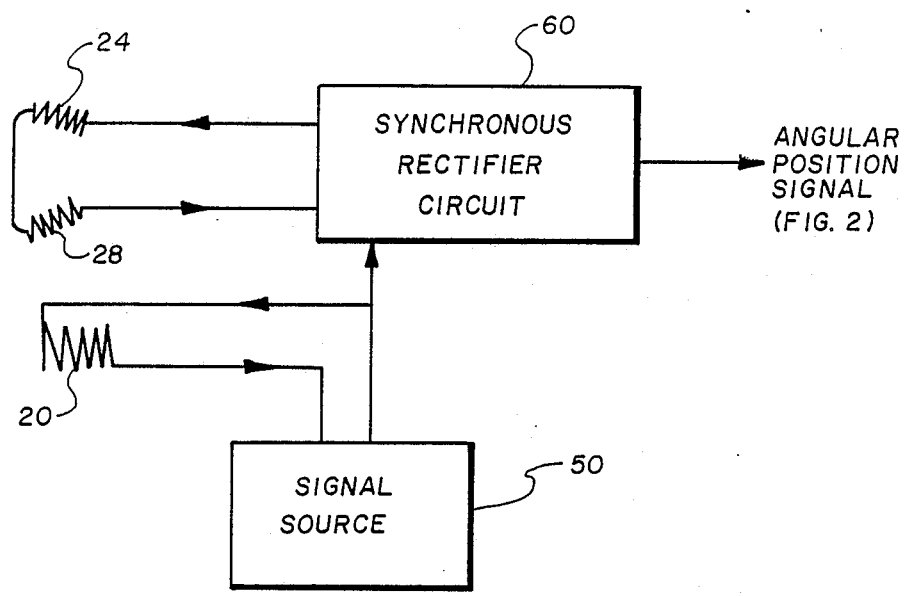
FIG. 3 is a schematic of an exemplary circuit suitable for use with the RVDT hardware of FIG. 1.

FIG. 3 shows exemplary circuitry for use with the device of FIG. 1, including an AC signal source 50 which supplies a voltage to the primary winding 20, and a synchronous rectifier circuit 60 which is connected to and receives the voltage induced in the secondary windings 24 and 28. This output voltage is rectified to produce the possible voltage outputs shown in FIG. 2. This output, which indicates the angular position of the rotor core 8, may be supplied to a control unit (not shown) where the analog information may be displayed to provide a reading of the angular position of the rotor core.

It is to be understood that the above-described arrangements are only illustrative of the application of the principles of the present invention. Numerous modifications and alternative arrangements may be devised by those skilled in the art without departing form the spirit and scope of the invention, and the appended claims are intended to cover such modifications and arrangements.

What is claimed is:

1. A rotary variable differential transformer comprising
   a base element having a central, generally circular bore,
   a rotor having a shaft and a generally circular rotor core mounted off-center at one end of the shaft and in a plane normal thereto, said rotor core being rotatably disposed in the bore of the base element, with the shaft projecting from the rear thereof,
   a primary winding disposed in the bore to circumscribe the shaft rearwardly of the rotor core,
   first and second windings carried by the base element and positioned circumferentially about the bore, with the axes of the first and second windings oriented radially of the bore and generally in a common plane with the rotor core so that as the rotor core is rotated, its periphery moves into close proximity first with one of the windings and then with the other, said first and second windings being connected in series opposition,
   first and second cores disposed respectively in the first and second windings, and
   a conductive casing surrounding the sides and at least a portion of the rear of the base element, with an opening in the casing through which the shaft projects.

2. A transformer as in claim 1 wherein the first and second windings are spaced apart about the bore of the base element about 120 degrees.

3. A transformer as in claim 2 wherein the rotor core is mounted on the shaft off-center by about ten percent the diameter of the rotor core.

4. A variable differential transformer for determining angular displacement comprising
   a primary coil connectable to a voltage source,
   a rotor having a shaft whose angular displacement is to be determined and a generally planar rotor core mounted on the shaft with the shaft being generally normal to the rotor core, said rotor core being shaped to have a section which projects radially farther from the shaft than the rest of the rotor core, and said rotor being positioned so that the primary coil circumscribes the shaft below the rotor core,
   first and second secondary coils spaced apart about the periphery of the rotor core with their axes generally coplanar therewith and extending radially outwardly therefrom, said first and second coils being connected in series opposition and connectable to output circuitry,
   first and second magnetic material cores disposed respectively in the first an second windings, and
   magnetic flux carrying means for completing flux paths from the secondary coils and cores through the rotor core and shaft, back to the secondary coils and cores.

5. A transformer as in claim 4 wherein said first and second coils are spaced apart about the rotor core by about 120 degrees.

6. A transformer as in claim 5 wherein the flux carrying means comprises a magnetic material casing having side walls which surround the secondary coils, rotor core and primary coil, and a bottom wall below the primary coil, said bottom wall having an opening through which the shaft extends.

7. A transformer as in claim 6 wherein the rotor core is generally circular in shape and mounted on the shaft off center.

* * * * *